(12) United States Patent
Ayres

(10) Patent No.: US 6,687,220 B1
(45) Date of Patent: Feb. 3, 2004

(54) QUALITY OF SERVICE MANAGEMENT IN A PACKET DATA ROUTER HAVING MULTIPLE VIRTUAL ROUTER INSTANCES

(75) Inventor: Lawrence Ayres, Santa Barbara, CA (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/407,713

(22) Filed: Sep. 28, 1999

(51) Int. Cl.[7] .............................................. H04L 12/66
(52) U.S. Cl. ...................................... 370/229; 370/412
(58) Field of Search ................................ 370/229–235, 370/351, 395.21, 395.4, 395.41, 395.42, 363, 368, 371, 374, 378, 379, 381, 382, 383, 401, 402, 412, 415, 413, 416

(56) References Cited

U.S. PATENT DOCUMENTS

| 5,473,599 A | 12/1995 | Li et al. | |
| 6,324,165 B1 | * 11/2001 | Fan et al. | 370/232 |
| 6,400,685 B1 | * 6/2002 | Park | 370/232 |

FOREIGN PATENT DOCUMENTS

| EP | 0860 960 A2 | 8/1998 |
| EP | 0 926 859 A2 | 6/1999 |
| WO | WO 99/14958 | 3/1999 |

* cited by examiner

*Primary Examiner*—Ajit Patel
*Assistant Examiner*—Brenda Pham

(57) ABSTRACT

Methods and system architectures are disclosed for controlling the processing of data packets in a packet data router configured to support a plurality virtual router instances, with each virtual router instance storing received data packets in one or more respective ingress data queues. In a first exemplary aspect of the disclosure, the packet flow rates of one or more ingress data queues associated with a first virtual router instance are increased or decreased based on current operating conditions of the router. In a another exemplary aspect of the disclosure, the packet flow rates of one or more ingress data queues associated with a first virtual router instance are increased, while the packet flow rates of one or more ingress data queues associated with a second virtual router instance are decreased, respectively, in response to current operating conditions of the router, e.g., current processor or memory utilization.

21 Claims, 4 Drawing Sheets

QUALITY OF SERVICE MANAGEMENT IN A PACKET DATA ROUTER HAVING MULTIPLE VIRTUAL ROUTER INSTANCES

RELATED APPLICATION DATA

The present application is related to U.S. application Ser. No. 09/407,481, entitled, "Ingress Data Queue Management In A Packet Data Router," which was filed on the same day herewith and which is fully incorporated herein by reference for all it additionally teaches and discloses. The present application is also related to U.S. application Ser. No. 09/407,712, entitled, "Quality Of Service Management In A Packet Data Router System Having Multiple Virtual Router Instances," which was filed on the same day herewith and which is fully incorporated herein by reference for all it additionally teaches and discloses.

FIELD OF INVENTION

The present invention pertains generally to the field of packet data networks and, more particularly, to system architectures and methods for controlling the quality of service and system stability in a packet data router.

BACKGROUND

In a typical packet data router, packets originating from various source locations are received via a plurality of communication interfaces. Each packet contains routing information, such as a destination address, which is associated with a respective communication interface of the router, e.g., by a routing table or packet forwarding protocol. The router reads the routing information of each received packet and, if it recognizes the information, forwards the packet to the appropriate communication interface for further transmission to its destination. Packets without known destination address or forwarding protocol information are typically dropped.

Due to normal ebbs and flows in packet data traffic patterns and volume, a packet data router may be unable to immediately route newly received packets to respective designated communication interfaces. In particular, packet data traffic tends to have bursts of high activity, which is followed by lulls. Thus, a packet data router may be characterized as having a sustained data rate and a burst data rate. When receiving a burst of packet traffic, the router will temporarily store the received packets in an associated memory until it has the processing capacity available to process and forward the packets to their respective outgoing communication interface. When the sustained or burst data rates of a router are exceeded for a certain period of time, it is inevitable that further incoming packets will be dropped. Of course, while sometimes unavoidable, dropping unprocessed packets is undesirable because the source will then retransmit the dropped packet as part of its recovery procedure, which tends to prolong the congested state of the packet router and cause further unprocessed packets to be dropped.

Packet data network users often share either a single router, or router system, from a service provider. Multiple different internet users, for example, may connect via respective data modems or primary rate interface ("PRI") lines to a single internet protocol ("IP") router, or IP router system, operated by an internet service provider ("ISP"). These end users may be single customers themselves, or there may be multiple (e.g., networked) users combined as a single customer account by the ISP. Each customer account may be allocated a respective level of service priority and packet throughput bandwidth by the ISP, depending on the type and level of service connectivity that is contracted for.

For purposes of clarification, as referred to herein, a "router" is defined as a physical (as opposed to logical) entity having a defined number of physical communication interfaces (e.g., modems) under the control of one or more processors collectively executing a single control function. Typically, a single physical router operates under a single routing domain—i.e., wherein a packet received on any communication interface may be forwarded only to the same, or any other communication interface of the router. As referred to herein, a "router system" is defined as two or more independent routers, with an external controller for selectively directing common (incoming) packet data traffic to respective routers within the system.

It is known to implement within a single router one or more virtual router instances ("VRIs"). Each VRI has its own subset of communication interfaces, or logical circuits on a shared communication interface, and its own routing domain, but still under the control of a common control function with the other packet traffic handled by the router. In particular, a VRI exists as a collection of processes performed by the router, which correspond roughly to the layers in the TCP/IP protocol model. For example, a private network can be configured as a VRI, so that packet data may only be exchanged between end users on the same network. It has also been proposed to have a single VRI span multiple routers in a router system. For example, one suggested implementation is to have a dedicated interface link bridging respective communication interfaces of multiple routers having a common VRI.

Because of varying and often unpredictable growth rates, as well as other economic factors, a packet router, or packet router system, will not necessarily have the processing or memory capacity to simultaneously provide the contracted for bandwidth allocation for every user or VRI it services. Further, various users will connect to the IP router at different, often unpredictable, times and with varying rates and bandwidth needs.

An IP router is typically controlled with a real time operating system ("RTOS"), which allows multiple processes of different priorities to co-exist under the control of a common control function (e.g., within a single central processing unit). For example, the RTOS may have sensors that provide feedback information regarding current usage characteristics for a given user, which is used to adjust the RTOS operating parameters in response to changes in demand. Common applications for the RTOS are process control, motion control and, in certain applications, command and control.

The problem is that these operating systems often fail to effectively accommodate the different priority and bandwidth requirements contracted for by the end user customers of the ISP. In a motion control system, for example, the flow of information from sensors is into the system, and the flow of control signals is out of the system. There may be a lot of sensors, and there may be a lot of subsystems being controlled, but the input information does not circulate through the system and become the output. This has the effect of making the inherent control feature of the RTOS process/task priority ineffectual for controlling the system.

In particular, a typical IP router is a "packet driven" system. The more data packet it receives, the greater the load, and that load traverses the whole system such that the input is (for all practical purposes) the output. Thus, users whose connection to the router is handling the most packets will tend to monopolize the system resources.

For example, consider a router that is divided into two different VRIs, with each VRI having roughly the same number of end users and paying an ISP for the same quality of service ("QOS"), including identical priority and bandwidth requirements. Thus, the router should be able to provide the end users of each VRI with the same number of bits-per-second ("BPS") system throughput at any given time. Suppose, however, that the router processing capability is barely adequate to handle the peak load of even one of the VRIs without dropping unprocessed packets. If users of the first VRI have, in effect, tied up the router throughput processing capabilities, the users of the second VRI will not receive the service priority and bandwidth they are otherwise entitled to.

Thus, there is a need for methods and system architectures for more fairly regulating the processing of data packets through a packet data router, or router system, whereby the quality of service is balanced for each user and/or VRI, and wherein the system is kept stable, even when heavy loads occur.

SUMMARY OF THE INVENTION

In accordance with a first aspect of the invention, a method is provided for controlling packet data traffic in a router having a plurality of virtual router instances ("VRIs"), by dynamically adjusting the respective rates at which packets held in one or more ingress data queues associated with one or more VRIs are processed in response to current operating conditions of the router.

Preferably, the respective packet flow rates of the ingress data queues associated with the each VRI are independently adjusted. By way of example, in a preferred embodiment, the packet flow rates of the one or more ingress data queues associated with a first virtual router instance are decreased, and the packet flow rates of the one or more ingress data queues associated with the second virtual router instance are increased, respectively, in response to the same current operating conditions of the router.

In accordance with another aspect of the invention, a method is provided for controlling packet data traffic in a router having one or more processors collectively executing a single control function and having a processor utilization during operation of the router, the router further having a plurality of virtual router instances ("VRIs"), by dynamically adjusting the respective rates at which packets held in one or more ingress data queues associated with one or more VRIs are processed in response to current processor utilization of the router. Again, the respective packet flow rates of the ingress data queues associated with the each VRI are preferably independently adjusted.

By way of example, in a preferred embodiment, the packet flow rates of the one or more ingress data queues associated with a first VRI are decreased, and the packet flow rates of the one or more ingress data queues associated with the second VRI are increased, respectively, in response to the same processor utilization.

In accordance with yet another aspect of the invention, the packet flow rates of the one or more ingress data queues associated with one or more VRIs are periodically adjusted in order to maintain processor utilization, or memory utilization, or both, within a selected operating range.

In accordance with a still further aspect of the invention, the amount of memory allocated for storing packets in each of the one or more ingress data queues associated with one or more VRIs is periodically adjusted in order to maintain utilization of a memory associated with the router within a selected operating range.

As will be apparent to those skilled in the art, other and further aspects and advantages of the present invention will appear hereinafter.

BRIEF DESCRIPTION OF THE DRAWINGS

Preferred embodiments of the present invention are illustrated by way of example, and not by way of limitation, in the figures of the accompanying drawings, in which like reference numerals refer to like components, and in which.

DETAILED DESCRIPTION OF THE PREFERRED EMBODIMENTS

Figure 1:
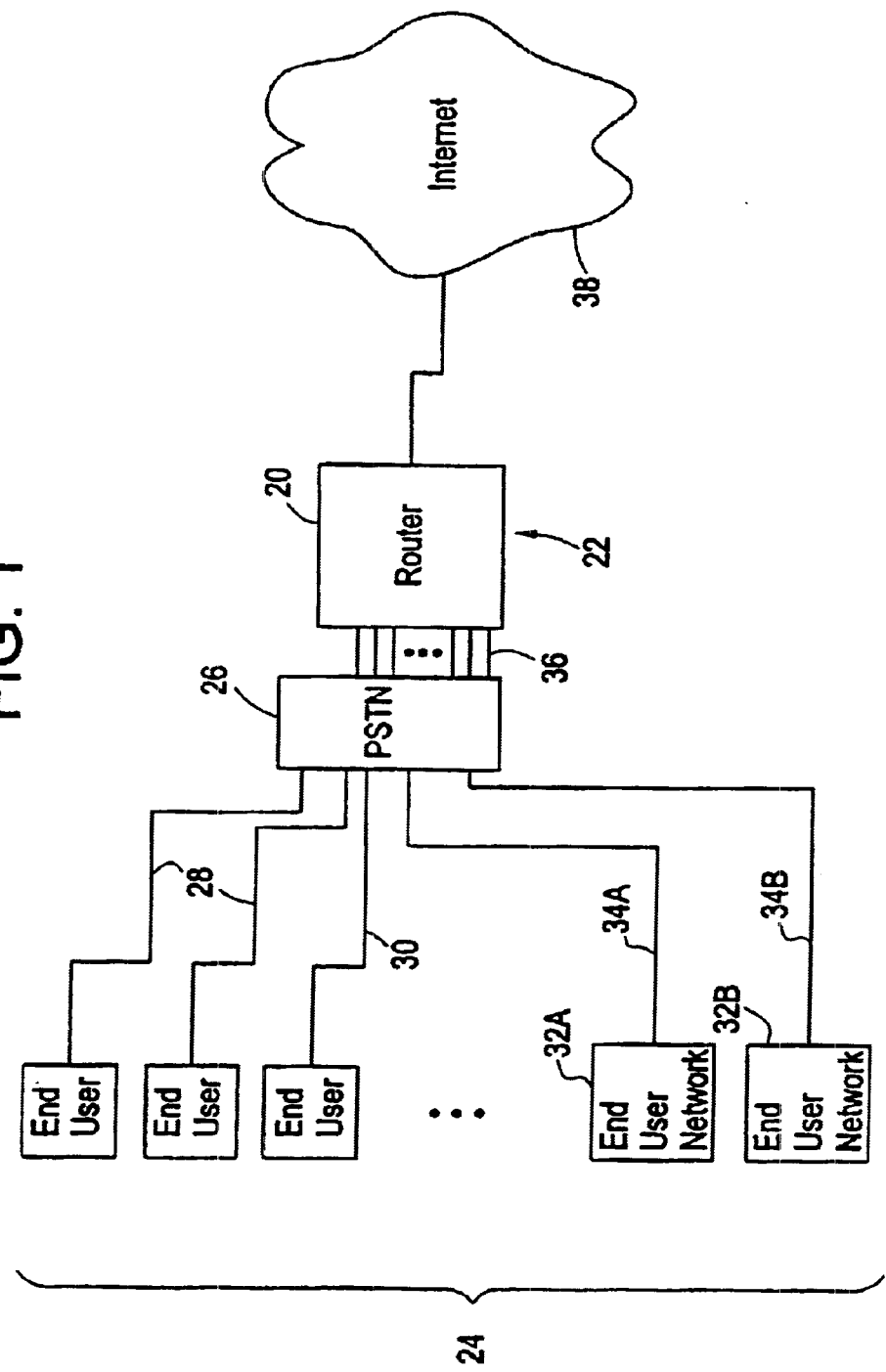
FIG. 1 is a simplified block diagram of a preferred packet data router employed as an internet gateway for multiple end users.

FIG. 1 illustrates a preferred packet data router 20 employed as an internet gateway by an internet service provider ("ISP") 22. The router 20 receives "upstream" data packets from a plurality of different end users 24. Based on routing information contained in each received data packet, the router 20 either (1) forwards the packet to a respective internet server 38; (2) forwards the packet to an end user 24 connected to the router 20; or (3) drops the packet due to it having an unknown destination address or being otherwise undeliverable. The router 20 also receives "downstream" data packets from the internet server(s) 38 and, if possible, forwards the received downstream packets to respective end users 24.

The end users 24 may comprise individuals connected to the router 20 over a traditional public switched telephone network ("PSTN") 26 via, e.g., dial-up modem connections 28, or a basic rate integrated digital services network ("ISDN") line 30. Respective end user networks 32A and 32B, each comprising a substantial number of end users 24, are connected to the router 20 via respective dedicated T1 lines 34A and 34B, which are also provided as part of the PSTN 26. From the PSTN 26, the respective communication links are forwarded via plurality of dedicated lines 36 to the router 20 at the ISP 22. Other communication links are also possible, such as, e.g., a wireless modem link (not shown), or a coaxial cable modem connection provided over a cable television network (not shown).

Figure 2:
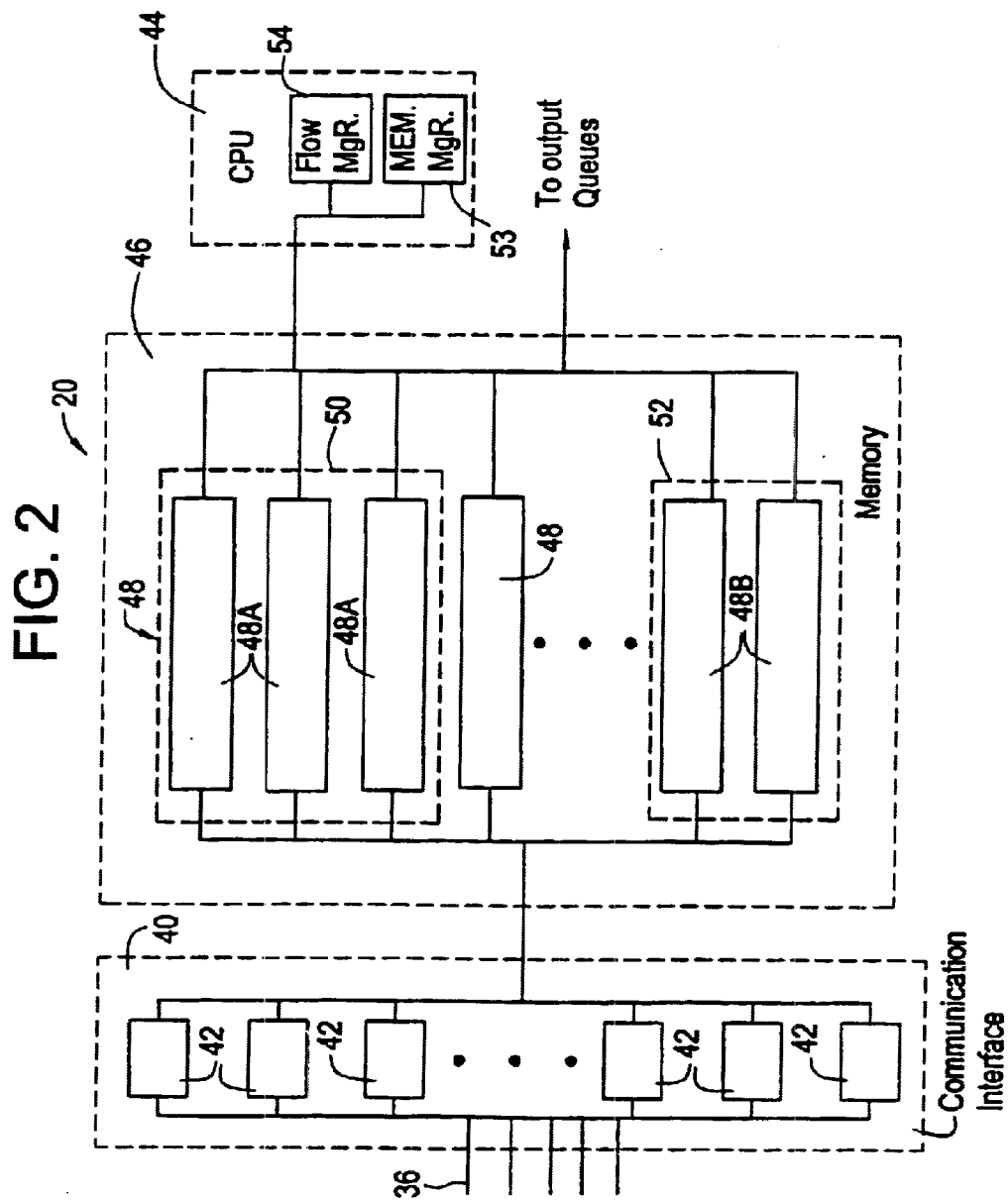
FIG. 2 is a simplified block diagram of ingress data queues stored in memory in the router of FIG. 1.

Referring to FIG. 2, the router 20 includes one or more processors collectively executing a single control function, which for ease in illustration are collectively shown in FIG. 2 and referred to herein as a single central processing unit ("CPU") 44. The router 20 also includes a shared buffer memory 46, which is preferably implemented as a dynamic random access memory ("DRAM"). At the router 20, the communication lines 36 from the PSTN 26 are terminated at a communication interface 40, comprising a plurality of a software configurable digital signal processors ("DSPs") 42. Upstream packets processed (i.e., demodulated) by the DSPs 42 are initially held in respective ingress data queues 48 formed as linked lists in the memory 46.

As will be appreciated by those skilled in the art, the ingress data queues 48 are software data structures that hold the stored packets for processing in a first-in, first-out (FIFO) fashion. The ingress data queues 48 implemented in the router 20 have the concept of "depth,"—i.e., a maximum number of stored packets that the respective queue can hold. The particular configuration of the ingress data queues 48 in the memory 46 may vary without departing from the inventive concepts taught herein. Notably, in the embodiment depicted in FIG. 2, each end user 24, networked end user group 32A/32B or VRI 50/52, may have one or more dedicated ingress data queues 48 for storing packets received by the router 20.

For example, data packets received from a first end user group 32A, and only packets received from group 32A, are stored in a first dedicated plurality of ingress data queues 48A. Likewise, data packets received from a second end user group 32B, and only packets received from group 32B, are stored in a second dedicated plurality of ingress data queues 48B. Alternatively, two or more end users 24 may share one or more ingress data queues 48, with a number of possible configurations.

In the embodiment depicted in FIG. 2, the ingress data queues 48A are implemented within the router 20 as a first VRI 50, and the ingress data queues 48B are implemented as a second VRI 52, with each VRI 50 and 52 having its own routing domain. Notably, the packet processing, or "flow rates" for VRI 50 or VRI 52 are the flow rates of the corresponding respective ingress data queues 48A and 48B.

There may be further VRIs implemented in the router 20, but only the first and second VRIs 50 and 52 are shown for ease in illustration in the inventive concepts herein. What is significant is that each VRI within the router 20 is assigned one or more manageable ingress data queues 48. In alternate preferred embodiments, the location of the manageable queues may be between VRI protocol layers, where the packet drop and delay parameters are known, instead of at the ingress points.

The CPU 44 selectively retrieves packets from the ingress data queues 48 on a FIFO basis, and forwards them to output queues (not shown) associated with the respective output destinations, or otherwise drops packets that are non-deliverable. The packets from each respective ingress data queue 48 are processed by the CPU 44 at a given "packet flow rate," which is defined generally as a number of packets processed by the CPU 44 from the respective ingress data queue 48 during a given processing interval. The packet flow rates of each ingress data queue 48 may differ and, as described in greater detail are controlled by a flow management process, or "flow manager" 53, which is a part of the RTOS of the router 20.

As will be apparent, if immediate processing by the CPU 44 of packets held in a given ingress data queue 48 is not possible, the length of the queue will increase accordingly. Of course, the memory 46 has a finite capacity for storing packets, and each ingress data queue 48 is allocated only a certain amount of buffer space in the memory 46. The number of stored packets of each ingress data queue 48 is tracked by a memory management process, or "memory manager" 53, which is a part of the RTOS of the router 20. Notably, the stored packet lengths may vary.

Generally, shared buffer memories, such as DRAMs, are well suited for use in a packet data router in that they provide relatively inexpensive, high storage capacity in a compact form. However, each read or write access into the memory 46 can be relatively time consuming because of the limited data bus bandwidth between the CPU 44 and the memory 46, as well as the inherent row address strobe latency in a DRAM (if applicable). In other words, it is relatively time and processor resource consuming for the CPU 44 to store (write) or retrieve (read) each data packet into or out of the memory 46.

Figure 3:
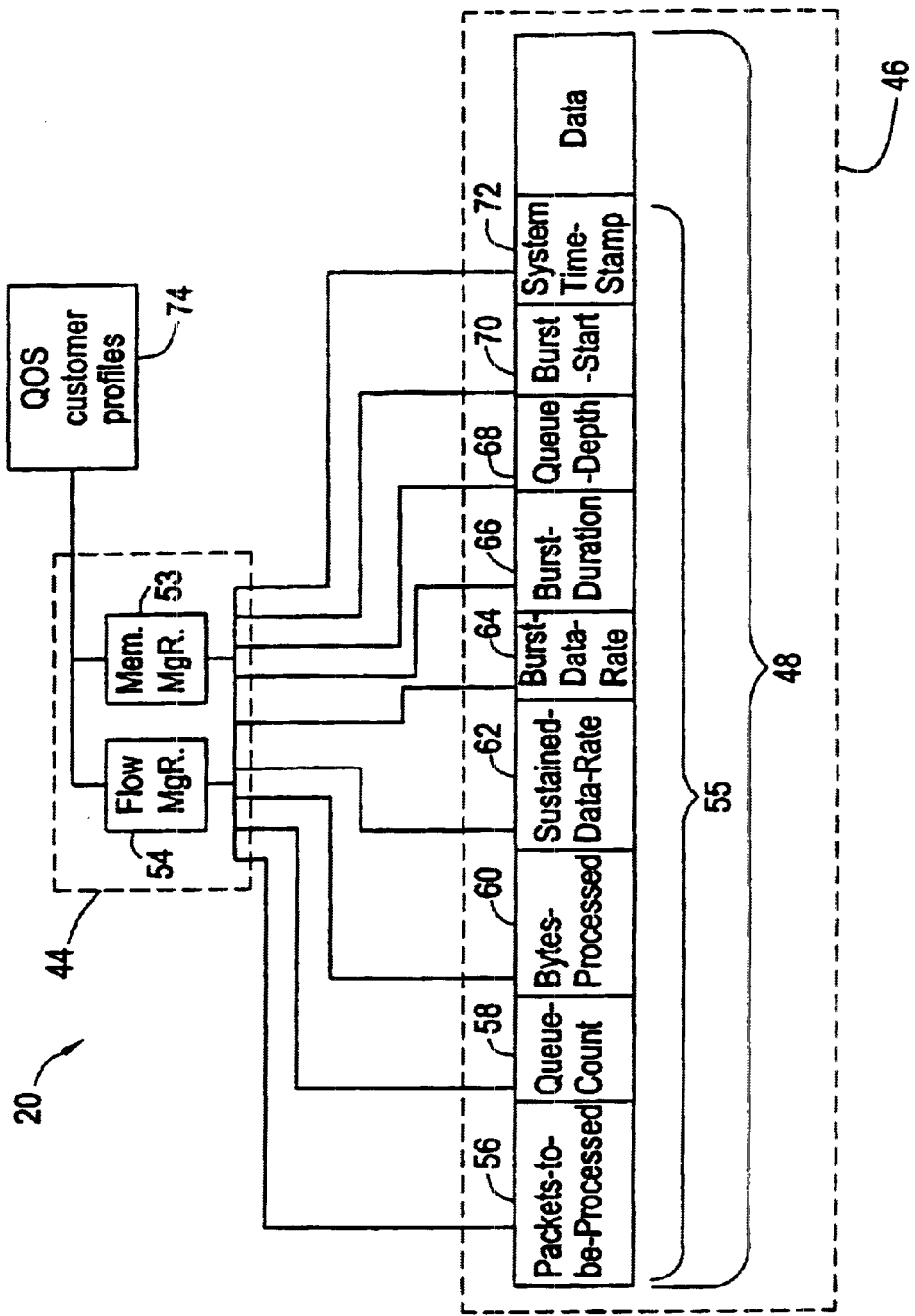
FIG. 3 is a box diagram illustration of a preferred packet flow and memory management process in the router of FIG. 1.

Referring to FIG. 3, the function of the flow manager 54 is to manage and control the data flow of the ingress data queues 48. In a presently preferred embodiment, the flow manager 54 is implemented as a system task that is repeated at a selected interval, e.g., once every second, for each ingress data queue 48. The flow manager 54 monitors the processing of data packets held in each ingress data queue 48 to manage the overall data flow through the router 20 and, in particular, utilization of the CPU 44 and memory 46.

Towards this end, the flow manager 54 maintains a data queue head structure 55 stored in the memory 46 as a header to each respective ingress data queue 48. The data queue head structure 55 includes several data fields employed by the flow manager 54 for controlling the packet flow rate and amount of memory allocated for the respective ingress data queue 48. In a preferred embodiment, the data fields in the data queue head structure 55 include:

(1) A "packets-to-be-processed" field 56 having a value indicating a number of packets held in the respective data queue 48 that are to be processed by the CPU 44 during a given processing interval.

(2) A "queue-count" field 58 having a value indicating the number of packets presently held in the respective data queue 48.

(3) A "bytes-processed" field 60 having a value indicating the number of data bytes processed from the respective data queue 48 during a present processing interval.

(4) A "sustained-data-rate" field 62 having a value, in bits per second, indicating a target maximum data processing rate for the respective data queue 48, e.g., based on a customer service agreement by the ISP 22.

(5) A "burst-data-rate" field 64 having a value, in bits per second, indicating an increased maximum data processing rate for the respective data queue 48, to be temporarily implemented upon receipt of a data burst.

(6) A "burst-duration" field 66 having a value, in seconds (or some fraction thereof, indicating a maximum duration of time for which the data rate specified in the burst-data-rate field 64 shall be maintained upon receipt of a data burst.

(7) A "queue-depth" field 68 indicating the maximum number of packets allowed to be held in the respective data queue 48 at one time—i.e., wherein any further received packets will be dropped until existing stored packets are processed to make room for more to be stored.

(8) A "burst-start" field 70 for holding a time stamp value indicating when receipt of a data burst on the respective data queue 48 has been detected.

(9) A "system-time-stamp" field 72 for holding a time stamp value indicating when a poll of the data queue head structure 54 was last performed.

As will be appreciated by those skilled in the art, the actual order of the data fields (1)–(9) is of no particular significance, and many variations are possible without departing from the inventive concepts disclosed herein.

In accordance with a general aspect of the invention, the flow and memory managers 54 and 53 constantly monitor the current operating conditions of the router 20, e.g., processor and memory utilization. The data fields (1)–(9) in each data queue head structure 55 are used by the flow and memory managers 54 and 53 to perform several tasks, including monitoring and adjusting the flow rate, managing the burst data rate and adjusting the memory allocation and usage, respectively, of each ingress data queue 48.

The flow manager 54 also monitors, e.g., as a periodic task, the respective flow rates of each ingress data queue 48 and, if appropriate, makes corresponding adjustments to the packet flow rate of one or more ingress data queues 48 in order to ensure overall system stability is maintained in a manner least impacting end user quality of service (QOS). In particular, system stability of the router 20 and, most importantly, the QOS for each user 24, user group 32A/32B and/or VRI 50/52 served by the router 20 may be best managed through control of the respective packet flow rates and proportional memory allocation of each of the individual ingress data queues 48.

For example, in accordance with a general aspect of the present invention, if processor utilization approaches or exceeds the upper end of a desired operating range, the flow manager 54 will decrease the packet flow rate of one or more ingress data queues 48 by decreasing the corresponding values of the packets-to-be processed field(s) 56. Conversely, if the processor utilization approaches or falls under the lower end of a desired operating range, the flow manager 54 may increase the packet flow rate of one or more ingress data queues 48 by increasing the corresponding values of the packets-to-be processed field(s) 56.

An advantage of controlling the processing of data packets on an ingress data queue level is that the system resources of the router 20 can be fairly distributed, or restricted, without individual end users 24, user groups 32A/32B or VRIs 50/52 being disproportionately impacted. A traditional RTOS of a router, on the other hand, cannot differentiate between end users having the same QOS, but accessing the router on different ingress data queues.

By way of illustration, suppose VRI 50 and VRI 52 have identical QOS profiles, but that at a given instance VRI 50 has only one active end user 24 on their network, while at the same instance VRI 52 has nineteen active end users 24. A traditional router RTOS system would allocate (and restrict) resources equally among the different users, i.e., with 5% of the total bandwidth to each end user 24, despite the fact that the lone end user 24 of VRI 50 should have half (50%) of the available router bandwidth, with the nineteen end users 24 of VRI 52 sharing the other half among themselves.

By being able to control the flow rates of individual ingress data queues, the present invention overcomes this drawback in the prior art. Also, individual user or VRI bandwidth guarantees (i.e., on an ingress data queue level) are possible with the present invention. Further, by controlling the data processing speed of an ingress data queue 48, an ISP 22 may enforce sub-rate bandwidth rates on high speed modems, e.g., allow a 56K modem connection for an end user whose QOS profile is only rated for 28.8K. Most importantly, independent control over the ingress data queues 48 allows for more predictability in dealing with peak traffic loads.

In accordance with this aspect of the invention, the flow manager 54 preferably adjusts the respective flow rates of the ingress data queues 48 independently of one another. Based on respective QOS profiles 74 maintained by the ISP 22, the flow manager 54 will adjust the flow rate of those ingress data queue(s) 48 that will least adversely impact QOS criteria for any one end user 24, user group 32A or 32B and/or VRI 50 or 52.

Certain aspects of each customer QOS profile are maintained in the data queue head structure 55 of each ingress data queue 48. For example, the sustained-data-rate field 62 sets forth a target maximum data processing rate for the respective ingress data queue 48, upon which the value of the packets-to-be-processed field 56 for the respective data queue 48 is calculated. In a preferred embodiment, the sustained-data-rate 62 for each ingress data queue 48 is initially determined based on the maximum allotted rate of any end user 24, user group 32A/32B or VRI 50/52 associated with the respective data queue 48. Thereafter, the sustained-data-rate 62 for each ingress data queue 48 is dynamically based on current operating conditions of the router 20. For example, the packet flow rates of one or more data queues 48A associated with VRI 50 and/or VRI 52 may be periodically adjusted in order to maintain processor utilization of the router 20 within a selected operating range.

The flow manager 54 also manages data bursts that may be received on each ingress data queue 48. The QOS user profiles 74 preferably provide for an end user 24 to be given an additional amount of packet processing bandwidth for a short period of time in order to accommodate for occasional burst packet traffic. For example, an end user 24 may need to transfer a large file once a month. Instead of having to pay for a more expensive sustained data rate bandwidth, the ISP 22 can offer the end user 24 an additional "burst data rate" for a specified duration of time (i.e., "burst duration").

In a preferred embodiment, the burst-data-rate 64 for a respective ingress data queue 48 is initially determined based on the highest maximum burst data rate guaranteed by the ISP 22 to any end user 24 associated with the respective ingress data queue 48. Similarly, the burst-duration field 66 for a respective ingress data queue 48 is initially determined based on the highest maximum burst duration guaranteed by the ISP 22 to any end user 24 associated with the respective ingress data queue 48. Thereafter, the burst-data-rate 64 and burst-duration 66 are dynamically adjusted for each ingress data queue 48 based on current operating conditions of the router 20.

Notably, the flow manager 54 may allocate differing sustained-data-rate 62, burst-data-rate 64 and burst-duration 66 values for one or more ingress data queues 48 based on off-peak usage criteria, e.g., time of day variances, but will preferably not decrease the flow rate of any ingress data queue 48 below the highest minimum rate guaranteed by the ISP 22 to any end user 24 (e.g., based on the user's QOS profile), associated with the respective ingress data queue 48, unless absolutely necessary to preserve system integrity.

Figure 4:
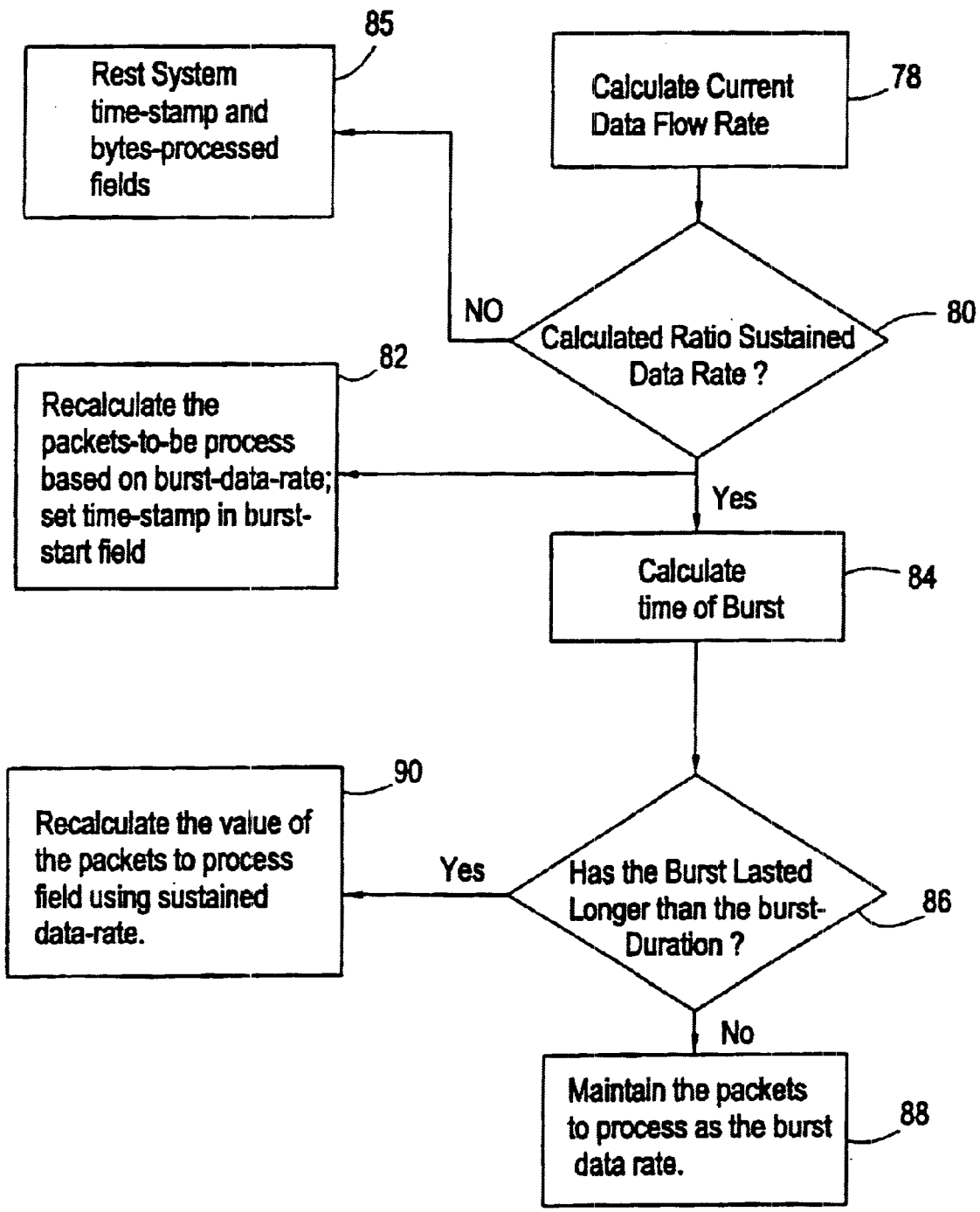
FIG. 4 is a flow chart illustrating a preferred method employed in the router of FIG. 1 to detect and adjust for a received packet data burst on an ingress data queue.

FIG. 4 depicts one preferred process by which the flow manager 54 detects whether a data burst is being received on a respective ingress data queue 48. The flow manager 54 periodically polling each ingress data queue 48 and calculating (at step 78) its current data flow rate 78 (in bits per second). In a preferred embodiment, the flow manager 54 calculates the current flow rate by multiplying the value of the bytes-processed field 60 of the data head queue structure 55 for the respective ingress data queue 48 by eight. The resultant product is then divided by the difference between the current time and the value of the system time-stamp field a 72. The flow manager 54 then compares (at step 80) the calculated current packet flow rate with the value in the sustained-data-rate field 62.

If the calculated rate is greater than the sustained-data-rate, the flow manager 54 assumes a data burst is occurring on the respective ingress data queue 48. The flow manager 54 then recalculates (at step 82) the value of the packets-to-be-processed field 56 based on the value of the burstdata-rate field 64, and places a time stamp with the present time in the burst-start field 70. If no received burst is detected,—i.e., if the calculated data rate is equal to or less than the sustained-data-rate field 62,—the flow manager 54 (at step 85) updates the system time stamp field 72 and resets the value of the bytes-processed filed 60 for the next polling cycle.

If a data burst is detected on an ingress data queue 48, the flow manager 54 periodically calculates (at step 84) the duration of the data burst by calculating the difference between the present time and the time stamp in the burst-start field 70. The flow manager then compares (at step 86) the calculated burst duration with the value in the burst-duration field 66.

If the duration of a present data burst is less than the value of the burst-duration field 66, the flow manager maintains (at step 88) the value of the packets-to-be-processed field 56 based on the value of the burst-data-rate field 64. If the duration of the burst has lasted longer than the value of the burst-duration field 66, the flow manager 54 recalculates the value of the packets-to-be-processed field 56 based on the value of the sustained-data-rate field 62.

In a preferred embodiment, the values of the burst-data-rate field 64 and the burst-duration field 66 may be adjusted by the flow manager 54 based on current operating conditions in the router. By way of example, as a customer service benefit, the ISP 22 may configure the flow manager 54 to increase the values of the burst-data-rate field 64 and the burst-duration field 66 so long as the processor utilization of the router 20 is at or below a specified operating range.

With reference back to FIG. 3, the memory manager 53 monitors the respective queue-count and queue-depth fields 58 and 68 for each ingress data queue 48 as part of the memory management process. If overall utilization of the router memory 46 approaches or exceeds the upper end of a desired range, the memory manager 53 will decrease the amount of memory allocated for one or more ingress data queues 48 by decreasing the values of the corresponding queue-depth field(s) 68. Conversely, if utilization of the memory 46 approaches or falls under the lower end of a desired range, the memory manager 54 may increase the amount of memory allocated for one or more ingress data queues 48 by increasing the corresponding values of the queue-depth field(s) 68. In a preferred embodiment, the memory manager 53 increases the queue-depth field 68 of an ingress data queue 48 upon detecting a received data burst. In doing so, it may be necessary to simultaneously decreasing the queue-depth fields 68 of one or more other ingress data queues 48 in order to maintain memory utilization.

As with the packet flow rates, the amount of memory allocated for storing packets in each ingress data queue 48 is preferably determined independently of the memory allocated for all other queues 48. In a preferred embodiment, the queue-depth field 68 is initially determined based on the collective maximum amount of memory allotted for every end user 24, user group 32A/32B and/or VRI 50/52 associated with the respective data queue 48. Thereafter, the queue-depth field 68 for each ingress data queue 48 is dynamically based on current operating conditions of the router 20. For example, the queue-depth fields 68 of one or more data queues 48A associated with VRI 50 and/or VRI 52 may be periodically adjusted in order to maintain utilization of the memory 46 within a selected range.

The memory manager 53 will adjust the queue-depth fields 68 of those ingress data queue(s) 48 that will least adversely impact QOS criteria for any one end user 24, user group 32A or 32B and/or VRI 50 or 52, e.g., based on respective QOS profiles 74 maintained by the ISP 22. Preferably, the memory manager 53 will not decrease the queue-depth field 68 of any ingress data queue 48 below the highest minimum rate guaranteed by the ISP 22 to the collective end users 24, user groups 32A/32B and/or VRIs 50/52 associated with the respective data queue 48.

The operating processes making up the respective memory manager 53 and flow manager 54 are preferably linked to improve the management tools available for the router 20. For example, if processor resources are available, the flow manager 54 will decrease the packet flow rate(s) of one or more ingress data queues 48,—i.e., to increase the processing rate of the stored packet back load,—in order to decrease memory utilization. In fact, if possible, it may be preferred from a QOS point of view to temporarily increase the packet flow rates of those ingress data queues 48 having the highest queue-count fields 58, rather than reduce the queue-depth fields 68, in order to avoid or minimize dropped packets.

While preferred embodiments and applications of the present invention have been shown and described, as would be apparent to those skilled in the art, many modifications and applications are possible without departing from the inventive concepts herein. Thus, the cope of the disclosed invention is not to be restricted except in accordance with the appended claims.

What is claimed:

1. A method for controlling the processing of data in a router associated with a communication network wherein said router includes a plurality of communication interfaces, the method comprising:

maintaining a plurality of virtual router instances wherein each virtual router instance represents a virtual router and is assigned with its own subset of said communication interfaces;

associating one or more first queues to a first virtual router instance;

associating one or more second queues to a second virtual router instance;

receiving data packets associated with said first virtual router instance within said router;

storing each of said received data packets within one of said first queues;

processing said stored data packets within said router in accordance with certain data processing rates associated with said one or more first queues; and adjusting the data processing rates of one or more first queues associated with said first virtual router instance based on current operating conditions of the router wherein said data processing rates of said one or more first queues are adjusted independently of the data processing rates of said one or more second queues.

2. The method of claim 1, further comprising adjusting the data processing rates of one or more second queues associated with said second virtual router instance based on current operating conditions of the router.

3. The method of claim 2, wherein the data processing rates of the one or more first queues associated with the first virtual router instance are adjusted based on current utilization of memory associated with said router.

4. The method of claim 2, wherein the data processing rates of the one or more first queues associated with the first virtual router instance are decreased, and the data processing rates of the one or more second queues associated with the second virtual router instance are increased, in response to the same operating conditions of the router.

5. The method of claim 3 wherein said one or more first queues have a respective allocated amount of memory in which to store said received data packets, further comprising
adjusting the data processing rates of said one or more first data queues by increasing or decreasing the amount of memory allocated for said one or more first queues associated with said first virtual router instance based on current utilization of the memory within said router.

6. The method of claim 1, wherein the data processing rates of the first queues associated with the first virtual router instance are adjusted based on current utilization level of an associated processor within said router.

7. The method of claim 1 further comprising the step of assigning a data queue header for said first queues wherein said data queue header includes data field for controlling said data processing rates and said data field stores a packet-to-be-processed value for indicating a number of packets held in said first queues that are to be processed by said router in a given processing interval.

8. The method of claim 7 wherein said data queue header further stores a bytes-processed value for indicating a number of data bytes processed from said first queues during a present processing interval.

9. The method of claim 7 wherein said data queue header further stores a queue-depth value for indicating the maximum number of packets allowed to be held in said first queues at one time.

10. A method for controlling the processing of data in a router associated with a communication network wherein said router includes a plurality of communication interfaces, the method comprising:
maintaining a plurality of virtual router instances within said router wherein each of said virtual router instance represents an independent logical router and is associated with its own subset of said communication interfaces within said router;
maintaining a plurality of ingress data queues wherein one or more of said ingress data queues are assigned to a first virtual router instance within said plurality of virtual router instances;
receiving data packets associated with said first virtual router instance;
storing said received data packets within said assigned one or more of said ingress data queues;
processing said stored data packets within said router in accordance with data process rates of said one or more of said ingress data queues; and
periodically adjusting the packet flow rates of said one or more ingress data queues associated with said first virtual router instance in order to maintain processor utilization within a selected operating range.

11. The method of claim 10, further comprising
periodically adjusting the packet flow rates of the one or more ingress data queues associated with a second virtual router instance, independent of the periodic adjustments to the one or more ingress data queues associated with the first virtual router instance.

12. The method of claim 10 wherein said router comprises a memory and wherein said step of periodically adjusting adjusts
the packet flow rates of said one or more ingress data queues based on current utilization of the memory within said router.

13. A router for controlling the processing of data in a communication network wherein said router includes a plurality of communication interfaces, comprising:

means for maintaining a plurality of virtual router instances wherein each virtual router instance represents a virtual router and is assigned with its own subset of said communication interfaces;
means for associating one or more first queues to a first virtual router instance;
means for associating one or more second queues to a second virtual router instance;
means for receiving data packets associated with said first virtual router instance;
means for storing each of said received data packets within one of said first queues;
processor for processing said stored data packets in accordance with certain data processing rates associated with said first queues; and
wherein said processor adjusts the data processing rates of one or more first queues associated with said first virtual router instance based on current operating conditions of the router wherein said data processing rates of said one or more first queues are adjusted independently of the data processing rates of said one or more second queues.

14. The router of claim 13, wherein said processor adjusts the data processing rates of one or more second queues associated with said second virtual router instance based on current operating conditions of the router.

15. The router of claim 13, wherein said router comprises a memory and the data processing rates of the one or more first queues associated with the first virtual router instance are adjusted based on current utilization of memory associated with said router.

16. The router of claim 14, wherein the data processing rates of the one or more first queues associated with the first virtual router instance are decreased, and the data processing rates of the one or more second queues associated with the second virtual router instance are increased, in response to the same operating conditions of the router.

17. The router of claim 15 wherein said one or more first queues have a respective allocated amount of memory in which to store said received data packets, wherein said processor adjusting the packet flow rates of said one or more first data queues by increasing or decreasing the amount of memory allocated for said one or more first queues associated with said first virtual router instance based on current utilization of the memory within said router.

18. The router of claim 13 wherein said processor adjusts the data processing rates of one or more first queues associated with said first virtual router based on the utilization of said processor in order to maintain processor utilization within a selected operating range.

19. The router of claim 13 wherein said first queues are associated with a data queue header including data field for controlling said data processing rates and said data field stores a packet-to-be-processed value for indicating a number of packets held in said first queues that are to be processed by said router in a given processing interval.

20. The router of claim 19 wherein said data queue header further stores a bytes-processed value for indicating a number of data bytes processed from said first queues during a present processing interval.

21. The router of claim 19 wherein said data queue header further stores a queue-depth value for indicating the maximum number of packets allowed to be held in said first queues at one time.

* * * * *